United States Patent
Ribi et al.

(10) Patent No.: US 7,204,199 B2
(45) Date of Patent: Apr. 17, 2007

(54) THERMOPOLYMERIC SWITCHING MEDIUMS AND TEMPERATURE MONITORING DEVICES EMBODYING SUCH MEDIUMS

(75) Inventors: Hans O. Ribi, San Mateo, CA (US); Gary M. Thompson, Turlock, CA (US)

(73) Assignee: Volk Enterprises, Inc., Turlock, CA (US)

( * ) Notice: Subject to any disclaimer, the term of this patent is extended or adjusted under 35 U.S.C. 154(b) by 0 days.

(21) Appl. No.: 10/807,001

(22) Filed: Mar. 23, 2004

(65) Prior Publication Data

US 2005/0211153 A1 Sep. 29, 2005

(51) Int. Cl.
*G01K 11/06* (2006.01)

(52) U.S. Cl. ........................... 116/218; 374/160

(58) Field of Classification Search ................ 116/216, 116/217, 218; 374/160, 161, 162, 55, 205; 99/342, 343, 344
See application file for complete search history.

(56) References Cited

U.S. PATENT DOCUMENTS

| | | | |
|---|---|---|---|
| 945,978 A | 1/1910 | Nielsen | |
| 1,509,110 A | 9/1924 | Potter | |
| 2,938,384 A * | 5/1960 | Soreng et al. ................ 60/527 |
| 3,140,611 A | 7/1964 | Kliewer | |
| 3,682,130 A | 8/1972 | Jeffers | |
| 3,693,579 A | 9/1972 | Kliewer | |
| 3,713,416 A | 1/1973 | Volk | |
| 4,083,364 A | 4/1978 | Kelly | |
| 4,170,956 A | 10/1979 | Wear | |
| 4,289,088 A | 9/1981 | Scibelli | |
| 4,818,119 A | 4/1989 | Busch | |
| 4,871,811 A * | 10/1989 | Gaku et al. .................. 525/148 |
| 5,109,054 A * | 4/1992 | Smith .......................... 524/514 |
| 5,144,880 A * | 9/1992 | Schmit ......................... 99/342 |
| 5,244,996 A * | 9/1993 | Kawasaki et al. ........... 526/347 |
| 5,323,730 A | 6/1994 | Ou-Yang | |
| 5,362,802 A * | 11/1994 | Amici et al. ................... 525/57 |
| 5,537,950 A | 7/1996 | Ou-Yang | |
| 5,574,076 A * | 11/1996 | Sharak et al. ................ 523/128 |
| 5,574,084 A * | 11/1996 | Peacock ...................... 524/270 |
| 5,779,364 A * | 7/1998 | Cannelongo et al. ........ 374/160 |
| 5,852,083 A * | 12/1998 | Walsh et al. ................. 524/104 |
| 5,988,102 A * | 11/1999 | Volk et al. ................... 116/218 |
| 6,239,250 B1 * | 5/2001 | Hefner et al. ................ 528/392 |
| 6,949,504 B2 * | 9/2005 | Mondet et al. ................. 514/1 |
| 2005/0211153 A1 * | 9/2005 | Ribi et al. .................... 116/218 |

FOREIGN PATENT DOCUMENTS

DE 3229020 A1 2/1984

OTHER PUBLICATIONS

Polymers for Cosmetics and Personal Care "INTELIMER® Polymers", Issued May 2004, LANDEC Corporation, p. 1 of 1; as printed from the website on Jan. 17, 2007.*

* cited by examiner

*Primary Examiner*—R. Alexander Smith
(74) *Attorney, Agent, or Firm*—Laurence Po. Colton; Powell Goldstein LLP

(57) ABSTRACT

The use of thermopolymeric switching medium in temperature monitoring devices in which thermopolymeric switching medium is used as a retaining materials and are based on polymeric compositions that can be designed and programmed to meet selective parameters in production and performance. The thermopolymeric switching mediums can be formulated in a pure state or can include additives, such as fillers or active materials to impact the characteristics of the thermopolymeric switching component.

36 Claims, 2 Drawing Sheets

THERMOPOLYMERIC SWITCHING MEDIUMS AND TEMPERATURE MONITORING DEVICES EMBODYING SUCH MEDIUMS

BACKGROUND OF THE INVENTION

1. Technical Field

This invention relates to thermopolymeric switching mediums and their use in thermally responsive indicating devices. More particularly, this invention relates to the use of thermopolymeric switching mediums in temperature monitoring devices and to temperature indicating devices that provide a signal upon the attainment of specified temperatures.

2. Prior Art

Thermally responsive indicators are useful in a variety of fields for providing a visual indication of the attainment of a specified temperature. For example, U.S. Pat. No. 4,083,364 discloses a thermal indicator mounted through the skull of an animal to detect the presence of an elevated body temperature. German Patent No. 3229020 discloses a thermally responsive indicator that is designed to be mounted on an electrical conductor to provide a visual indication of the attainment of an elevated temperature in the conductor. U.S. Pat. No. 4,818,119 discloses a railroad wheel bearing bolt with an axially extending bore into which a heat sensor and indicator are inserted in which the indicator is exposed when a specified temperature is attained. U.S. Pat. No. 4,289,088 discloses a sterility indicating device for use in a steam autoclave.

Thermally responsive indicating devices also are useful in preparing food products, particularly meat and fowl. Such devices, such as the Pop Up® brand of disposable temperature indicating devices offered by Volk Enterprises, Inc. of Turlock, Calif., US, can be used to indicate the elevated temperature of the interior of the food product, rather than the temperature of the exterior thereof. By indicating the attainment of a specified internal temperature of the food product, the device can signal when the food product is organoleptically acceptable. These devices must be sufficiently accurate to prevent undercooking or overcooking, which not only may significantly diminish the palatability of the food, but may also even render the food dangerous to eat, as in the case of undercooked meats.

Examples of such indicating devices for use in cooking foods are described in U.S. Pat. Nos. 945978 and 1,509,110, each of which allows a plunger biased by a spring to be released into an extended position upon attaining a specified temperature. Retaining means, which is typically a fusible material, holds the plunger in a retracted position until the fusible material yields, at which time a spring urges the plunger into an extended position. When in the extended position, the plunger provides a visual indication to the user that the food is cooked to an acceptable temperature level and doneness. To further enhance the visibility of the plunger when it is in the extended position, a cap may be attached to the end thereof.

The material of the retaining means has typically comprised metal alloys, as in U.S. Pat. Nos. 3,140,611, 3,682,130, 3,693,579 and 3,713,416 or organic compounds, as in U.S. Pat. Nos. 5,323,730 and 5,537,950. While devices employing such retaining materials have proven useful, they can have certain drawbacks. For example, metal alloys often are more difficult to process.

Organic compounds, such as waxes, have been suggested as replacements for metal alloys. However, waxes typically yield over a relatively wide temperature range, and, if composed of a mixture of different materials, can have multiple melting temperatures, thereby resulting in a premature or a delayed signal. Thus waxes in their current form may not be suitable for temperature indicating devices for use in cooking foods.

A device that attempts to overcome some of the issues exhibited by alloy and wax retaining materials is described in U.S. Pat. No. 4,170,956. This patent discloses a nitrogen-based organic retaining material. The nitrogen-based material used in this device does not exhibit some of the drawbacks of their alloy predecessors and can exhibit better release characteristics than waxes. However, nitrogen-based materials also can have certain drawbacks. For example, because the nitrogen-based materials of U.S. Pat. No. 4,170,956 are very pure when they are prepared, and melting temperature, and therefore yield temperature, tends to increase with increased purity, the materials melt at approximately 84.9° C. when they are tested in their purest state. A turkey is considered done when its interior temperature reaches approximately 82.2° C. Consequently, the nitrogen-based retaining material must be mixed with a foreign substance to reduce its purity. The use of foreign substances adds unnecessary expense. Salts, which are added to the nitrogen-based material to clean it, tend to solidify to form gel globules in the material, thereby requiring that the material be strained. The straining process often must be conducted repeatedly, thereby increasing the time and cost of production. The yield is reduced, and, consequently, a greater amount of material must be manufactured and processed to obtain a given amount of retaining material.

The use of saturated organic compounds is disclosed in U.S. Pat. No. 5,323,730 in which an indicator is disclosed for providing an indication that a food item has attained a desired temperature. The indicator includes an organic retainer comprising a saturated organic compound that maintains a plunger in a retracted position until the material from which the retainer is constructed yields. When the retainer yields, a spring urges the plunger toward an extended position to indicate that the food item has attained the desired temperature.

The use of fatty ketones is disclosed in U.S. Pat. No. 5,537,950 in which an indicator is disclosed for providing an indication that a food item has attained a predetermined temperature. The indicator comprises a barrel having a cavity wherein a plunger is disposed in a retracted position using a retaining material. The retaining material melts when a predetermined temperature is reached releasing the plunger towards an extended position. The retaining material comprises a fatty ketone and at least one other organic compound selected from the group consisting of fatty amides and fatty anilides.

Thermopolymeric switching materials can be used in a variety of commercial products, most notably those that require a well-defined thermal transition from a solid phase to a liquid phase and often thermally cycled multiple times. Natural polymers such as natural rubbers, cellulosic materials and other biologic materials have limited utility for most temperature cycling processes. Synthetic and natural monomeric substances may be obtained that have well defined thermal melting and solidification characteristics, but often are discrete and do not provide a chemistry platform for modification. Synthetic polymers can be produced that can be made to respond to temperature changes under controlled conditions. Synthetic polymeric materials have the advantage of being able to respond within a few degrees to melt or solidify, change their permeability, change their adhesive characteristics, change their biologic properties, as well as number of other property changes often required for product applications.

Moreover, because synthetic polymers can be designed and prepared to function within predetermined ranges of activity using specific modifications within a class of monomeric materials comprising the polymeric composition, synthetic polymers provide a great deal of versatility within a specific class of reagents. More specifically thermopolymeric compositions, with their predictable temperature switching characteristics can find use in temperature monitoring functions where the thermopolymeric material acts as a physical indicator of a temperature event such as heating or cooling.

BRIEF SUMMARY OF THE INVENTION

This invention provides a thermopolymeric switching medium and its use as a thermal indicator. Generally, the invention is capable of determining when an article has reached a specific temperature. In one illustrative embodiment, the invention is capable of indicating that an article of food is heated to a specified temperature. An example indicator is a disposable temperature indicating device comprising a barrel having an opening communicating with a chamber within the barrel, a plunger disposed in the chamber and adapted for sliding travel therein between a retracted position and an extended position, means for resiliently biasing the plunger away from the retracted position and toward the extended position, and retaining means for releasably retaining the plunger in the retracted position. The barrel is adapted for insertion into the article of food to be heated.

The retaining means comprises a material formed from a mixture comprising one or more thermopolymeric materials. Many types of organic and synthetic polymers can be used as the thermopolymeric material and a wide variety of polymers can be utilized as thermopolymeric switching mediums. Selection of the polymeric composition depends on several key criteria relevant to applications of the thermomechanical switching devices including: the activation temperature that the device is intended to indicate; the flow and viscosity parameters for processing the material and inclusion into the device during manufacturing; the nature and sharpness of the transition melting temperature; the size of the molecular weight as it relates to reduction in potential in absorption in vivo resulting from any food contact contamination; how odor-free the material is; the sheer strength of the material in an inactivated device; the desired amount of creep or stretching of the material in a stored device; the adhesion strength of the material to an adjacent surface within a device; the cost-of-goods as it relates to the total cost of producing a product device; and the desired moisture stability and resistance of the material within an activated device.

Each thermopolymeric switching medium used preferably has a single melting point. It is also preferred that the melting temperature of the mixture is in the range of from about 56° C. to about 95° C. and that the mixture melts within about 15° C. of the melting point. The aforementioned thermopolymeric compounds can be used in reduced quantities when compared to the metal alloys and organic compounds of the prior art, and therefore are relatively less expensive to use and can result in a substantial cost savings per unit. More importantly, the thermopolymeric compound retaining materials are not toxic and are therefore safer for use in food. Generally speaking, this material provides a platform approach to providing a broad range of materials that trigger at different temperatures. The material properties can be set by using various proportions of different thermopolymeric compounds, yet other materials can be admixed with the thermopolymeric compounds without affecting performance. Due to their high molecular weight nature, thermopolymeric compounds are inherently more physiologically compatible due to the significantly lower risk of the materials being absorbed through the lining of the gut.

PREFERRED EMBODIMENTS OF THE PRESENT INVENTION

Figure 1:
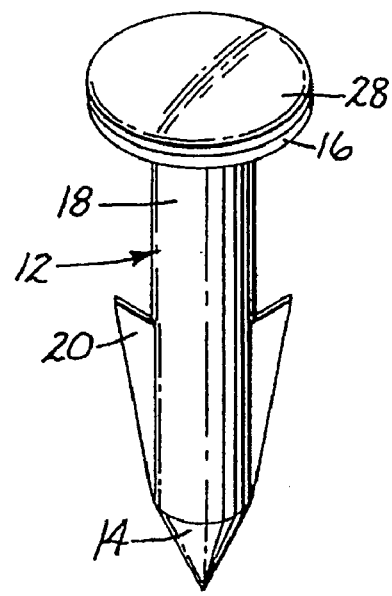
FIG. 1 is an inclined side elevation view of an illustrative embodiment of an indicator that can be used with the present invention.

The present invention is primarily directed to improvements in retaining materials for use in temperature monitoring devices such as temperature indicating devices. More specifically, the present invention is a composition suitable for preparing the retaining material, the composition comprising one or more of a wide variety of organic and synthetic polymers as thermopolymeric switching mediums. The term "thermopolymeric switching medium" will be used throughout this specification to denote the compositions of the invention. The term "temperature monitoring device" will be used throughout this specification to denote all of the devices in which the thermopolymeric switching medium can be used as a retaining material. For ease of reference, the invention will be disclosed in connection with a food temperature indicating device as the illustrative temperature monitoring device; however, the invention can be used with any suitable mechanical temperature monitoring device.

Initially, following is a disclosure of an illustrative temperature monitoring device as a foundation for the later disclosure of the thermopolymeric switching medium. Referring to FIGS. 1 through 4, an illustrative exemplary prior art temperature monitoring device 10 is shown. Temperature monitoring device 10 includes barrel 12, which is a monolithic molded body made of a material capable of withstanding the elevated temperatures encountered in a cooking environment. Nylon is an exemplary material, although other materials could be adapted for use in the cooking environment as well. Barrel 12 includes lower barrel end 14 adapted for insertion into a food item and may be provided with one or more barbs 20 radially disposed near lower barrel end 14 for retaining the temperature monitoring device 10 in the food once inserted. Barrel 12 also includes annular flange 16 located adjacent upper barrel end 18. Flange 16 may be of varying radial dimensions so as to contact the surface of the food item when temperature monitoring device 10 is inserted therein to prevent further insertion.

Figure 2:
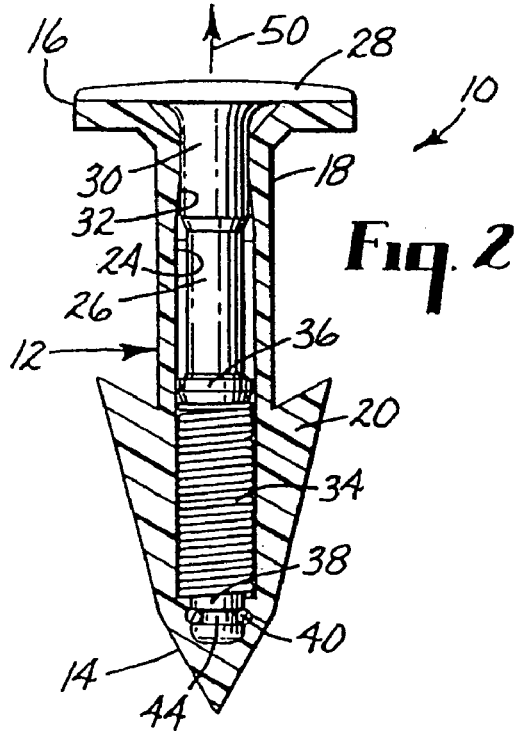
FIG. 2 is a central longitudinal sectional view of the indicator of FIG. 1 in a retracted position.
Figure 3:
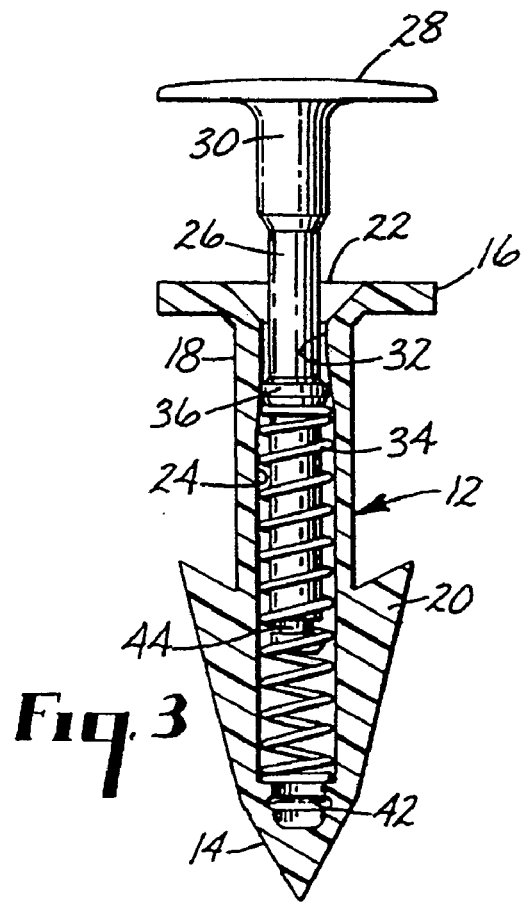
FIG. 3 is a central longitudinal sectional view of the indicator of FIG. 1 in an extended position.
Figure 4:
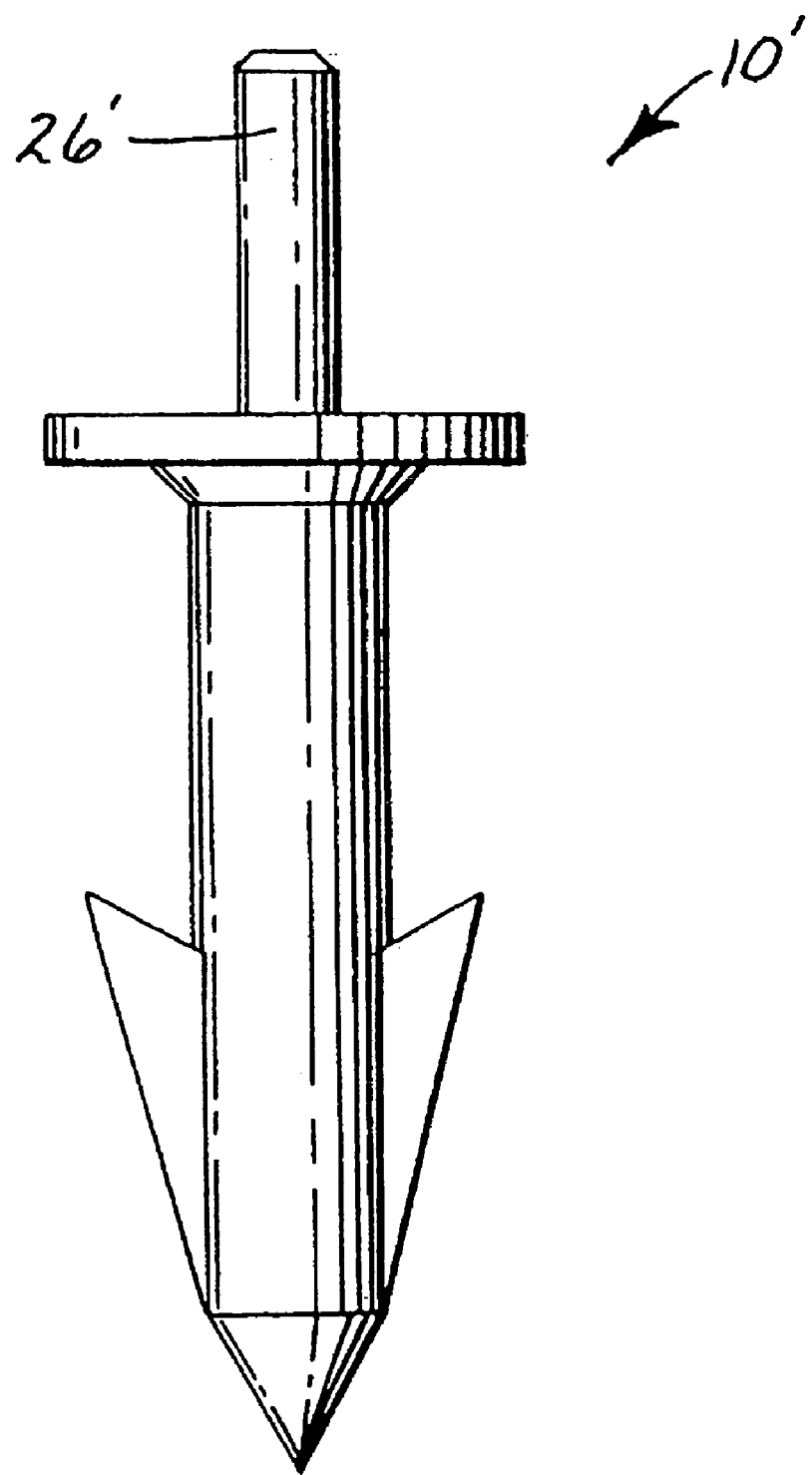
FIG. 4 is a side elevation view of an alternate illustrative embodiment of an indicator that can be used with the present invention.

Barrel 12 communicates through orifice 22 with cavity 24. Cavity 24 is adapted to contain at least part of indicator 26, such as a plunger, that is disposed through orifice 22 of barrel 12 and is maintained in slidable relation thereto within cavity 24. Indicator 26 is adapted to travel between a retracted position and an extended position. FIGS. 1 and 2 illustrate indicator 26 in a retracted position, but the term retracted position is not limited to one in which cap 28 is in intimate contact with flange 16. Additionally, the exemplary indicator 26, when constructed without cap 28, may be in a retracted position with upper plunger end 30 either within cavity 24 or partially protruding therefrom. FIGS. 3 and 4 illustrate indicator 26 in an extended position. Indicator 26 provides a visual indication of the attainment of a predetermined temperature when indicator 26 is in an extended position.

Means can be provided to resiliently bias indicator 26 toward the extended position. In the illustrated embodiment, the biasing means comprises spring 34. In FIG. 2, spring 34 is circumferentially disposed about indicator 26 and exerts a force in direction 50 against annular plunger flange 36 located on indicator 26. The opposite end of spring 34 contacts and exerts a force against annular seat 38, formed in cavity 24. Other biasing means include hinges, bent rods, accordions, springs, and the like that take advantage of certain materials natural tendency to return to a preformed position. In one illustrative embodiment, the device comprises a molded device that incorporates the barrel and a biasing device in a single formed unit, thus eliminating the need for separate metal springs 34. In another illustrative embodiment, the device comprises a thermopolymeric material in the form of a coil. When the coil heats up, it uncoils, turning a needle, hand or other indicator means to show the progress of the cooking. For example, a needle indicator means could turn, like a clock or thermometer, to point to a "done" indication. For another example, the coil could turn a colored dial such that in the uncooked state, the dial would show a first color and in the cooked state, the dial would have rotated to show a second color.

In the embodiment shown in FIGS. 1–4, retaining means are provided to maintain indicator 26 in a retracted position prior to use against the force of spring 34 or other biasing means. The retaining means includes a retaining material, namely the thermopolymeric switching material 40 of the present invention, positioned within cavity 24 to mechanically interfere with indicator 26. In the illustrated embodiment, thermopolymeric switching material 40 is positioned within annular retainer cavity 42, which is aligned with annular plunger depression 44. Both retainer cavity 42 and plunger depression 44 are illustrated as annular semi-hemispherical depressions, but any configuration which will permit mechanical interference between thermopolymeric switching material 40 and retainer cavity 42, and/or between thermopolymeric switching material 40 and plunger depression 44 is contemplated. Furthermore, thermopolymeric switching material 40, plunger depression 44 and retainer cavity 42 could be located at any point along indicator 26 so as to retain indicator 26, but are preferably located adjacent lower barrel end 14.

Indicator 26 is maintained in a retracted position by the thermopolymeric switching material 40 until, after exposure to an elevated temperature at or near the preselected temperature, thermopolymeric switching material 40 yields, allowing spring 34 to move indicator 26 in direction 50. The melting temperature, as used herein, means the onset temperature or the temperature at which the thermopolymeric switching material 40 begins to melt. The temperature at which all the thermopolymeric switching material 40 has melted is immaterial to the present invention, because yielding can occur before all the thermopolymeric switching material 40 has melted. Yield as used herein, means fuse, melt, plasticize, or become ductile, malleable, or deformable to the point where the thermopolymeric switching material 40 is of insufficient shear strength to maintain the indicator 26 in a retracted position against the pressure of spring 34. Yield temperature, as used herein, means the temperature at which yielding occurs, and is typically near the melting temperature, although the exact yield temperature differs depending on the particular thermopolymeric switching material 40 selected.

Yielding may occur by one of several mechanisms. Once the ambient temperature reaches the melting temperature of thermopolymeric switching material 40, part of the thermopolymeric switching material 40 may liquefy, and thereafter function as a lubricant. Alternatively, thermopolymeric switching material 40 may liquefy quickly and be of insufficient shear strength to maintain shaft 36 in the retracted position. Thermopolymeric switching material 40 also may soften until spring 34 causes part of thermopolymeric switching material 40 to be sheared away by retainer cavity 42. Once the shear strength of thermopolymeric switching material 40 has diminished, spring 34 or other biasing means urges shaft 36 into an extended position, which provides a visual indication of the attainment of the specified temperature. Referring to FIG. 3, indicator 26 is shown in the extended position, which position corresponds to the ambient temperature being above the yield temperature of thermopolymeric switching material 40.

Cap 28 can be affixed atop indicator 26 and is adapted to maintain intimate contact with flange 16. When indicator 26 is in a retracted position, cap 28 prevents contaminants from entering cavity 24, and prevents thermopolymeric switching material 40 from leaking out of cavity 24 of temperature monitoring device 10. Cap 28 also provides increased visibility when indicator 26 is in the extended position. Upper plunger end 30 can be adapted to maintain sliding sealing contact with cavity wall 32 to further aid in preventing contaminants from entering, or retaining material from leaving cavity 24.

Referring to FIG. 4, an alternate illustrative embodiment 10' of a disposable temperature indicator for determining whether a food item is cooked to a desired temperature and doneness using the present invention is shown. Cap 28 has been omitted, thereby presenting indicator 26' for visual identification upon the attainment of the specified temperature.

Now that an illustrative device incorporating the present invention has been disclosed, the thermopolymeric switching medium 40 will be disclosed in more detail. The compositions suitable for preparing the thermopolymeric switching material 40 of this invention can comprise one or more of a wide variety of organic and synthetic polymers as the thermopolymeric switching medium 40. Selection of the polymeric composition depends on several key criteria relevant to the specific or selected applications of the temperature monitoring devices 10 including the activation temperature that the temperature monitoring device 10 is intended to indicate, the flow and viscosity parameters for processing the thermopolymeric switching medium 40 and inclusion into the temperature monitoring device 10 during manufacturing, the nature and sharpness of the transition melting temperature, the size of the molecular weight as it relates to reduction in potential in absorption in vivo resulting from any food contact contamination, how odor-free the thermopolymeric switching medium 40 is, the sheer strength of the thermopolymeric switching medium 40 in an inactivated device, the desire for low creep or stretching of the thermopolymeric switching medium 40 in a stored device, the adhesion strength of the thermopolymeric switching medium 40 to an adjacent surface within a temperature monitoring device 10, the cost-of-goods as it relates to the total cost of producing a temperature monitoring device 10, the desired moisture stability of the thermopolymeric switching medium 40, and the resistance of the thermopolymeric switching medium 40 within an activated temperature monitoring device 10.

One or more thermopolymeric switching mediums can be used in various ratios to allow switching at preselected temperatures. For example, known thermopolymeric switching mediums melt or yield at known temperatures or within known temperature ranges. These pure thermopolymeric switching mediums can be used to produce temperature monitoring devices that are activated at the melting temperature of the known thermopolymeric switching medium. Further, combinations of two or more thermopolymeric switching mediums also melt or yield at known temperatures or within known temperature ranges, and/or these melting temperatures and yielding temperature ranges can be determined by those of ordinary skill in the art. These combined thermopolymeric switching mediums can be used to produce temperature monitoring devices that are activated at the melting temperature of the combined thermopolymeric switching mediums.

The adherent characteristics of thermopolymeric switching medium 40 provide for temperature monitoring device 10 configurations compatible with a variety of mechanical triggering motions and are suitable for direct visual observation. Thermopolymeric switching medium 40 can be formulated to retain contact with the mechanical switching substrate thereby precluding the thermopolymeric switching medium 40 from entering the item undergoing temperature monitoring.

Thermopolymeric materials provide for molding stable configurations of the thermopolymeric switching medium 40. Various configurations can be introduced which enable less material to be utilized relative to pure monomeric organic switching mediums. Alternatively, since the thermopolymeric material can be formulated to behave like plastics used in an injection molding process, gates can be designed into an injection mold which permit the co-molding of a stem material with the thermopolymeric switching medium 40. This approach provides for the integrated molding of a single stem/switching medium component that can be used to reduce subsequent molding steps in the temperature monitoring device 10 production process.

Generally speaking, any thermopolymers can be used, and are selected based on the temperature to which the food is being cooked. Higher melting point temperature thermopolymers thus could be preferred for higher temperature indicators and lower melting point thermopolymers thus could be preferred for lower temperature indicators. Further, one would select a thermopolymer to reduce the tendency to creep or degrade at or near the operating temperatures.

Production Processes

Temperature monitoring devices 10 incorporating thermopolymeric switching medium 40 can be produced in many ways. Thermopolymeric switching medium 40 can be transferred to temperature monitoring device 10 in either a powdered solid state, a pellet form, or in a liquid dispensed form. Thermopolymeric switching medium 40 adheres to both indicator 26 and cavity wall 24, thus holding indicator 26 in the retracted position until the specific temperature has been reached.

Ultrasonic welding can be used as a means for fusing indicator 26 through to the inner surface of barrel 12. The ultrasonic welding process can be used to melt the thermopolymeric switching medium 40 transient thereby making adherent contact between the opposing surfaces, namely the outer surface of indicator 26 and the inner surface of barrel 12, and the thermopolymeric switching medium 40. The fusion process can be completed after terminating the ultrasonication process. Ultrasonication fusion has the advantage of rapid fusion between indicator 26 and barrel 12 obviating the need for bulk melting and annealing. Since the ultrasonication process is transient, the thermopolymeric switching medium 40 melting and annealing process is transient and instantaneous.

As adhesion will be primarily between the opposing regions of indicator 26 and barrel 12, the amount of the thermopolymeric switching medium 40 can be minimized to a stable adherent layer. The stable adherent layer of thermopolymeric switching medium 40 can be initially applied to either indicator 26 surface or to barrel 12 surface. The application method can include a variety of means such as dip coating, spray coating, powder coating embossing, injection coating and the like.

To effect the ultrasonic welding process, a suitable quantity of thermopolymeric switching medium 40 is placed in the appropriate position within cavity 24, preferably within retainer cavity 42, or on indicator 26 surface, preferably on or within depression 44. Indicator 26 is inserted along with spring 34 into cavity 24, with the lower end of indicator 26 being within retainer cavity 42. Ultrasonic welding causes thermopolymeric switching medium 40 to adhere to indicator 26 and to retainer cavity 44 wall, thus holding indicator 26 in the retracted position within cavity 24.

The adherent layer of thermopolymeric switching medium 40 can range from several millimeters to five microns. More usually, the layer will range from one millimeter to 10 microns. Typically, the adherent layer will range from 50 to 500 microns. The adherent layer of thermopolymeric switching medium 40 can be applied to a treated or non-treated surface of indicator 26 or barrel 12.

The surface of indicator 26 and/or barrel 12 can be textured or treated to facilitate and maximize the adherent properties between the surface and the thermopolymeric switching medium 40. Smooth surfaces tend to provide poor or strong adherence depending on the physical and chemical compatibility characteristics of either the media or the surface. Surfaces can be treated chemically or with energy such as ionizing energy to compact the surface with sufficiently strong adhesive properties. Ionization, plasma irradiation, chemical etching and the like can provide means for surface treatments.

Alternatively, the indicator 26 or barrel 12 can be molded to include surface structures or relief structures with good adhesive characteristics between the opposing surfaces. Molding can be accomplished to include micro-grain finishes on the order of 1 millimeter to one micron. More usually, the surface can include grain structures ranging from 10 microns to 500 microns. Typically, the structures will be from 50 microns to 250 microns. Roughened surface structures can be periodic or diffuse. The structures can be directly introduced into the injection mold. The mold will create the molded surface in either indicator 26 or barrel 12 during the injection molding process. Opposing molded relief structures can be introduced to maximize surface area contact between indicator 26 and barrel 12.

Surface designs can include features to facilitate flow of thermopolymeric switching medium 40 during the filling process and through to the cooling/annealing process surfaces. Maximum flow and surface coverage of the thermopolymeric switching medium 40 in contact with both surfaces ensures maximum contact and adherence between the two surfaces. Maximum adherence is desirable since it minimizes the amount of the thermopolymeric switching medium 40 necessary for effective banding and thermoswitching.

A variety of device configurations are provided which include single component mechanical switching implements or multi-component mechanical switching implements. The complexity and utility of a particular temperature monitoring device 10 configuration depends on the application of interest. Multi-component switching devices can include existing temperature indicating devices such as the exemplary embodiments disclosed above that employ barrel 12 to contain the thermopolymeric switching medium 40, spring 34 for creating a mechanical response, indicator 26 for responding to the thermal triggering indication, and thermopolymeric switching medium 40 that responds to the thermal conditions by melting to facilitate the mechanical switching response of spring 34.

Complex temperature monitoring devices 10 can include additional mechanical parts for multiple switching mechanisms or be simplified to include fewer mechanical parts. In one case, the temperature monitoring device 10 can include barrel 12 or in-kind holder, spring 34 and thermopolymeric switching medium 40. In this case, barrel 12 components can be modified to be contiguous with indicator 26. Indicator 26 can be physically attached to barrel 12 through a bridge. The bridge can provide an attachment means between indicator 26 and barrel 12 or other holding component.

The bridge can be a continuation between indicator 26 and the holding component and can be a simple connector between the two components. The bridge can provide a pivoting means for maintaining contact between indicator 26 and the holding component. The bridge can be used to maintain contact between the components while providing the necessary properties so as not to restrain indicator 26 from dislodging during a temperature activation event. The bridge can be a simple model feature maintaining contact to a continuous indicator holder part. Spring 34 can provide the necessary force to cause the temperature monitoring device 10 to thermally respond. The thermopolymeric switching medium 40 can provide the adherent characteristics necessary to ensure accurate temperature induced melting and device triggering.

The location of thermopolymeric switching medium 40 will depend on the intended triggering geometry of the temperature monitoring device 10. A practical temperature monitoring device 10 will have a coherent point of contact between one part of indicator 26 and another part of the holding portion. Spring 34 can be located to compliment the mechanical dislocation of indicator 26 and the holding section. In another embodiment, temperature monitoring device 10 can be simplified to eliminate incremental components such as spring 34. The spring constant in a spring 34 typically found in a disposable temperature indicator can be eliminated and replaced with molded geometries comprising indicator 26 and the holding component.

Features molded into a simple plastic part can include all components necessary for holding, forcing (for example providing a spring force constant) and indication (for example indicating that a cooking temperature was achieved). Molding geometries and configurations can vary depending on the desired application of interest, cost, size, visual output, ease of insertion or applying to a food to be temperature monitored, temperature reporting algorithm, durability and other relevant characteristics for a particular application of interest.

For devices containing only a single molded part such as barrel 12 and thermopolymeric switching medium 40, it is desirable to mold the indicator 26 and holder (barrel 12) section in a way that spring 34 can deliver the desired force for temperature triggering and yet be unaffected by the environment surrounding temperature monitoring device 10. Temperature monitoring device 10 must be constructed such that frictional forces applied to temperature monitoring device 10 during the insertion process into the item to be monitored, such as meats, does not impede the ability of spring 34 to exert the appropriate force when the desired temperature is reached.

An alternate embodiment of temperature monitoring device comprising a hinge region between indicator region and holding region such that hinge has spring-like properties. Bending hinge region to be in proximity or contact with holding region imparts spring-like qualities to hinge. The proximity will depend on the placement and location of thermopolymeric switching medium 40. By way of example, a temperature monitoring device can comprise a simple plastic rod. Thermopolymeric switching media 40 can be used to fuse both ends of the rod such that after fusion, a stable ring structure is formed. When heat is applied to the fusion point, thermopolymeric switching medium 40 will melt to release both opposing ends of the loop. The melting process will have a pre-determined temperature triggering point.

Thermopolymeric switching medium 40 can be transferred to temperature monitoring device 10 in either a powdered solid state, a pellet form or in a liquid dispensed form. Usually it is desirable to transfer thermopolymeric switching medium 40 in a liquid form through commercial dispensing means. Thermopolymeric switching medium 40 can be used in a variety of viscosities depending on the specific application of interest. Liquefied viscosities play a roll during dispensing of thermopolymeric switching medium 40 into temperature monitoring device 10.

Conveniently for dispensing, thermopolymeric switching medium 40 can be maintained in a liquid state for dispensing at an elevated temperature. Processing temperatures usually range from between 35° C. to 205° C. for dispensing. More usually, processing temperatures range from between 65° C. to 180° C., and typically, processing temperatures range from between 95° C. and 150° C.

Exemplary disposable temperature monitoring devices 10 such as those known in the art and that are suitable for use with the present invention also can be prepared and assembled in the following manner. Thermopolymeric switching medium 40 is heated and melted in a glass or stainless steel container to a temperature not to exceed the degradation temperature. The resultant molten thermopolymeric switching medium 40 is poured through a screen into another heated vessel (also at a temperature less than the degradation temperature) to strain out any foreign matter. A metered amount of thermopolymeric switching 40 is pumped into barrel 12, coated onto the inner wall of barrel 12, and/or coated onto indicator 26. In one embodiment, spring 34 is guided into barrel 12, and indicator 26 is then guided through spring 34 and into barrel 12.

The entire barrel 12 is heated while indicator 26 is slowly depressed into a retracted position. The temperature to which barrel 12 must be heated to melt thermopolymeric switching medium 40 within it depends on several factors, including the type of material used to construct barrel 12, the wall thickness of barrel 12, and the type of thermopolymeric switching medium 40 used. Once indicator 26 has been pressed into a retracted position and thermopolymeric switching medium 40 melted, indicator 26 is held in place by means known in the art, and therefore not shown, while temperature monitoring device 10 is cooled by a water source, thereby solidifying thermopolymeric switching material 40.

Additives to Thermopolymeric Switching Mediums

Inert additives can be added as extenders that have no effect on switching temperatures or activation temperature in temperature monitoring device 10. The additive can be used to reduce the amount of required thermopolymeric switching medium 40 such that less of thermopolymeric switching medium 40 needs to be used in bulk. The additive can be added from 0.1% to 99% by weight of thermopolymeric switching medium 40. Often 5% to 95% by weight of the additive to thermopolymeric switching medium 40 can be used. Usually 10% to 90% by weight of the additive can be added and more typically 20% to 80% by weight of the additive can be added to thermopolymeric switching medium 40.

Inert additives can be homogeneously dispersed into the thermal switching medium 40 by various mixing means including blending, stirring, sonicating, shaking, and the like. Dispersal is required so that the mixture can provide for uniform interaction between the thermopolymeric switching medium 40, barrel 12, and indicator 26. The additive can be mixed while thermopolymeric switching medium 40 is in a molten state or while thermopolymeric switching medium 40 is in a dried powder form.

Inert additives include fine particulate forms of sugars, salts, starches, cellulose non-melting metal filings such as aluminum, powdered plastics, polymers such as polyethylene glycol and polypropylene glycol, silicon and silicates, chromatography resins, ceramic resins, chalk, glass, sand, air, and any other materials that would not negatively impact the properties of the thermopolymeric switching materials. Inert additives also can include finely suspended liquids such as oils, water, and high boiling liquid polymeric materials. The liquid form of an inert additive should be selected such that it does not lubricate and adversely impact indicator 26 or barrel 12 and cause any unanticipated or premature triggering of the temperature monitoring device 12.

Interactive additives can be added to the thermopolymeric switching medium 40 that are intended to impact the physical characteristics of thermopolymeric switching medium 40. For example, additives can be added which can reduce or increase the melting transition of thermopolymeric switching medium 40. Additives can be selected to influence the melting transition, viscosity, elasticity, surface wetting characteristics, flow characteristics, softness or brittleness, pull strength or the like. Additives can be monomeric or polymeric in composition. An interactive additive can be added from 0.1% to 99% by weight of thermopolymeric switching medium 40. Often 5% to 95% by weight of the additive to thermopolymeric switching medium 40 can be used. Usually 10% to 90% by weight of the additive can be added and more typically 20% to 80% by weight of the additive can be added to thermopolymeric switching medium 40.

Additives to thermopolymeric switching medium 40 can remain solid from ambient temperatures to the temperature triggering range intended for temperature monitoring device 10. Additives to thermopolymeric switching medium 40 can begin as a solid from ambient temperatures and be intended to melt prior to the temperature triggering range intended for temperature monitoring device 10.

By way of example, monomeric interactive additives can be added to the bulk phase of thermopolymeric switching medium 40 to influence and adjust the melting characteristics of thermopolymeric switching medium 40. Alloys, eutectic mixtures or the like can be formulated such that a characteristic melting temperature of a given thermopolymeric switching medium 40 can be adjusted up or down from its known melting transition. Co-mixing interactive additives have the property of adjusting the known melting transition of a specific thermopolymeric switching medium 40 have the advantage of helping to produce a wide range of discrete temperature settings from one or only a few thermopolymeric switching medium 40 compositions. Further, such additives can be added to affect the hydrogen bonding characteristics, solubility, van der Waals interactions, and the like, of the materials, if necessary or desired, depending on the desired use.

Typically interactive additives will be selected base on their ability to influence thermopolymeric switching medium 40 as well as their compatibility for adequately mixing and dispersing into thermopolymeric switching medium 40 during processing. The additive should have physical/chemical characteristics that provide for adequate integration of the multi-component system. For example, the hydrocarbon chain length of an additive should be suitably consistent with the side chain length of an appended hydrocarbon chain on thermopolymeric switching medium 40 in order to provide for adequate mixing without phase separation. Components selected that phase separate can lead to inadequate interaction and therefore may have a limited effect and synergy for impacting the desired adjustment in the performance of thermopolymeric switching medium 40.

High or low melting transition interactive additives can be prepared from natural sources, petroleum distillation, or from organic synthesis. Natural sources include bee's wax, root extracts, long chain hydrocarbon analogs from the jojoba plant, and the like. Petroleum distillation analogs include long and short chain hydrocarbons and alcohols from petroleum materials suppliers (e.g. Baker Petrolite). Synthetic organic analogs can be prepared in a variety of forms including short and long chain alcohols, esters, acrylic esters, fluorinated hydrocarbons used to raise the transition melting temperature and the like. By way of example, natural, synthetic and petroleum distillation sources can be used as side chains, and thus become components of the thermopolymers themselves. Representative natural, synthetic and petroleum distillation sources can include polymeric analogs of docosanol (C22), tricosanol (C23), tetracosanol (C24), pentacosanol (C25), hexacosnaol (C26), heptacosanol (C27), octacosanol (C28), nonacosanol (C29), triacontanol (C30) and longer C30, C40 and extended analogs.

Additives can be co-mixed and blended with thermopolymeric switching medium 40 such that they either do or do not laterally phase separate with thermopolymeric switching medium 40 material. For example, Interlemer materials (Landec Inc., Menlo Park, Calif.) can be co-mixed with polyethylene glycols (Dow Chemical Company) where each material is phase separated from each other both in a melted form and a solid form. Components and sources of other known thermopolymeric switching materials also can be obtained from other sources such as Bay Materials, Menlo Park, Calif. Concentrations of the polyethylene glycol below 80% by weight can be employed which does not negatively impact the performance of the Interlemer material for temperature monitoring device 10.

Emulsifiers can be added to promote a uniform distribution of thermopolymeric switching medium 40 with an additive. Emulsifiers can include standard surfactants such as lipids, long chain alcohols, lecithins, glycol lipids, quaternized amines with lipid tails, charged ionic detergents or the like. Emulsifiers can be added at from 0.001% by weight to 10% by weight of the total thermopolymeric switching medium 40 additive composition. Often the emulsifier can be added at from 0.01% to 5% by weight. Usually the emulsifier can be added from between 0.1% to 1% by weight.

EXAMPLES

Following are examples of thermopolymeric switching mediums 40 suitable for use in the present invention. The following examples are not intended to limit or depart from the scope and spirit of the invention.

Example 1

This example is a high temperature C30 acrylic acid ester triacontanol and corresponding C30 polymer used as thermopolymeric switching medium 40. A high temperature thermopolymeric switching medium and a corresponding temperature indicating (timer) device were prepared and tested. The long chain alcohol triacontanol was custom synthesized (GFS Chemicals, OH). The alcohol was selected based on its high temperature melting transition (86° C.) in order to accommodate high cooking temperature applications for the disposable temperature indicator device. The alcohol was esterified using acrylic acid (GFS Chemicals, OH).

The acrylic acid ester of triacontanol was blended and polymerized (Landec Corp. CA) to the corresponding triacontanol acrylic polymer. The polymerization reaction was optimized to maintain a moderately low viscosity of the thermopolymeric switching medium in the molten state (35–45 cp at 121° C.). The triacontanol-based thermopolymeric switching medium was used a to prepare a series of high temperature disposable temperature indicator devices.

The temperature monitoring device prepared with this thermopolymeric switching medium functioned at an internal cooking temperature of 86° C.

Example 2

This example is a gap filled contact thermopolymeric switching device. A device was constructed using a nylon barrel (1.25 inch in length and 0.25 inch inner diameter). The barrel had a flattened bottom that was finished with a roughened texture to provide adherence of a thermopolymeric switching medium. The barrel was tapered at the bottom to an inside diameter of 0.15 inch. The barrel bottom geometry was such that a small platform or pedestal was encircled at the bottom's circumference. The platform or pedestal was used to create a location for partitioning the thermopolymeric medium.

A small amount, approximately 1–2 microliters, of liquefied thermopolymeric switching medium made from a Landec Interlemer material optimized for 70° C. was deposited on the bottom of the tapered barrel. The barrel was maintained at an elevated temperature to ensure that the deposited medium remained in a liquid state. After the medium was deposited, it was contained within the circumference of the bottom pedestal. The capillary forces between the liquid medium and the pedestal resulted in the maintenance of medium in a hemispherical droplet on the pedestal surface.

A stem was constructed to fit directly into the barrel unencumbered by any contact with the inside of the barrel. The stem was designed such that its end had a flat circular diameter identical to that of the bottom pedestal on the bottom of the barrel. Likewise, the flat bottom of the stem had a textured surface to provide adherence to a thermopolymeric medium. The stem was fit with a metal spring such that when the stem/spring assembly was inserted into the barrel, a flattened base on the stem came in direct contact with the liquid medium. The spring surrounding the stem was compressed to fit adjacent to the stem and yet contained within the walls of the barrel. The completed assembly was cooled to room temperature such that the molten medium was solidified. The solidified medium acted as an adhering agent between the stem bottom and the barrel bottom.

The device configuration utilized a minimum of thermopolymeric switching medium compared with traditional disposable temperature indicator temperature indicators. By way of example, a gap filled contact temperature monitoring device could be successfully assembled using only 1–2 milligrams of medium compared with a traditional disposable temperature indicator that uses between 25–35 milligrams of firing medium.

The temperature monitoring device prepared with this structure functioned at 70° C.

Example 3

This example uses an inert microparticulate as an extender for a thermopolymeric switching medium. A fine grain powdered confectioner's sugar was used as an inert additive to extend the total volume of a thermopolymeric switching medium. The inert microparticulate was selected to have no impact on the thermal melting and solidification of the thermopolymeric switching medium. Standard confectioner's sugar (C&H Pure Cane Sugar brand) was blended with a 62.2° C. thermopolymeric switching medium (Landec Corp. 269-65) at a weight ratio of 66.7% 269-65 and 33.3% confectioner's sugar. The 269-65 material was blended with the powdered sugar after first melting the 269-65 and stirring in the powdered sugar. Disposable temperature indicators were prepared using the extended thermopolymeric switching medium.

No odor was detected during a water-bath test. Ten disposable temperature indicators were prepared and tested. Five of the ten triggered at 62.2° C. and the other five triggered at an average of 62.5° C. The overall average gave a 2% standard deviation and provided equivalent temperature indication results compared with the 269-65 material alone without using confectioner's sugar as an extender.

In a second test, 50% 265-65 was blended with 50% confectioner's sugar. Ten disposable temperature indicators were prepared and tested. Five of the ten triggered at 62.2° C. and the other five triggered at an average of 62.5° C. The overall average gave a 2% standard deviation and provided equivalent temperature indication results compared with the 269-65 materials alone without using confectioners sugar as an extender.

Stability of the disposable temperature indicators prepared with the mixed composition was determined with a pull test where the stem was pulled with weight while the barrel was secured in a fixed position. Pull tests demonstrated good stability with seven pounds tension required to disconnect the stem from the barrel at room temperature.

Example 4

This example includes a color additive in the thermopolymeric switching medium for inventory control. Thermopolymeric switching mediums can be pre-colored using standard dyes and pigments. Thermopolymeric switching mediums produced for specific temperature applications can be conveniently color coded by adding dyes or pigments to achieve a visible coloration. Food grade dyes are preferable due to the food grade nature of the product application. By way of example, a 62.2° C. thermopolymeric switching medium (Landec Corp. 269-65) was pre-colored using a yellow 5 FDC (Sensient Technologies, Inc.). The dye was blended in powder form at 1% by weight to a dried, powderized sample of the thermopolymeric switching medium. The mixture was melted and liquefied at 121° C. The dye was blended with the medium until uniformly dispersed.

Disposable temperature indicators were prepared and tested for performance compared to disposable temperature indicators made without added dye. The overall triggering average gave 2% standard deviation at 62.2° C. and provide equivalent temperature indication results compared with the thermopolymeric switching medium material alone without using confectioners sugar as an extender.

Example 5

This example uses a dip coating process for producing disposable temperature indicator devices with a thermopolymeric switching medium. Stems (indicators) for the disposable temperature indicator can be dip coated with the thermopolymeric switching material by dip coating the end of the stem. The coating process is used as an alternative means of introducing the thermopolymeric switching medium into the disposable temperature indicator device during production compared with injecting or dispensing the thermopolymeric switching medium into the barrel of the temperature monitoring device.

The 62.2° C. thermopolymeric switching medium (Landec Corp. 269-65) was maintained as a molten solution at 121° C. Disposable temperature indicator stems were suspended above the molten solution and uniformly dipped into the molten solution up to 0.2 inch in depth. The stems were removed from the molten thermopolymeric switching medium such that a thin bulbous coating of the thermopolymeric switching medium remained on the tip of the disposable temperature indicator stem. The thermopolymeric switching medium cooled rapidly to room temperature within one minute to a hardened coating.

The disposable temperature indicator construction was completed by applying a tension spring over the stem and subsequently compressing the stem and spring assembly into the barrel of the disposable temperature indicator device. The temperature monitoring device was heated in a flowing bath to above the melting transition of the thermopolymeric switching medium, the spring and stem then were compressed into the bottom of the disposable temperature indicator barrel, and then the entire device was rapidly cooled to below the melting transition of the thermopolymeric switching medium. The cooling process was accomplished in less than 1 minute at 0.5° C. The final assembled device provided for a pre-loaded disposable temperature indicator product.

Other examples include, but are not limited to, uses as a thermopolymeric coated spring in a disposable temperature indicator device, as a thermopolymeric coated metal tension spring/cantilever, as a single component thermal indicating device, as foam air/thermal polymeric mediums to reduce loading, and as thermally stable composites with spring action device. A further exemplary use is in a device that can twist like a coil thermometer where the dial reveals a first and a second colored plastic to show the doneness of the food item. In such a use, the thermopolymeric material behaves mechanically like a metal coil in a coil thermometer, uncoiling and coiling upon the addition or removal of heat respectively, thus turning a dial or other indicator means to show different colors or other indicia to indicate the doneness (or undoneness) of the food item The above detailed description of the preferred embodiments, examples, and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. A thermal indicator for visually determining and monitoring temperature of cooking food, comprising:
   a) a body having an orifice;
   b) indicating means capable of moving through the orifice relative to the body from a first position to a second position for visually indicating when a preselected temperature has been reached and that the food is cooked to a desired temperature and doneness; and
   c) a thermopolymeric switching medium contained within the body for allowing said indicating means to dynamically indicate when said preselected temperature has been reached, wherein said thermopolymeric switching medium comprises at least one thermopolymeric material that, when at a temperature below the predetermined temperature, maintains said indicating means at the first position, and that, when at a temperature equal to or higher than the predetermined temperature, yields to permit release of said indicating means to the second position visually indicating that the food is cooked to a desired temperature and doneness,
   whereby the thermopolymeric switching medium undergoes a thermal transition from a solid phase to a liquid phase at the predetermined temperature indicating the food is cooked to the desired temperature and doneness.

2. The thermal indicator as claimed in claim 1, wherein the thermopolymeric switching medium is an organic polymer.

3. The thermal indicator as claimed in claim 1, further comprising at least one inert additive selected from the group consisting of sugars, salts, starches, cellulose non-melting metal filings, powdered plastics, polymers, silicone, silicates, chromatography resins, ceramic resins, chalk, glass, sand, air, oils, water, and high boiling liquid polymeric materials, and combinations thereof.

4. The thermal indicator as claimed in claim 3, wherein the inert additive is present in an amount between 0.1% to 99% by weight of thermopolymeric switching medium.

5. The thermal indicator as claimed in claim 3, wherein the inert additive is present in an amount between 5% to 95% by weight of thermopolymeric switching medium.

6. The thermal indicator as claimed in claim 3, wherein the inert additive is present in an amount between 10% to 90% by weight of thermopolymeric switching medium.

7. The thermal indicator as claimed in claim 3, wherein the inert additive is present in an amount between 20% to 80% by weight of thermopolymeric switching medium.

8. The thermal indicator as claimed in claim 1, further comprising at least one interactive additive selected from the group consisting of bee's wax, root extracts, long chain hydrocarbon analogs from the jojoba plant, petroleum distillation analogs, and synthetic, organic analogs, and combinations thereof.

9. The thermal indicator as claimed in claim 8, wherein the at least one interactive additive is selected from the group consisting of short and long chain alcohols, esters, acrylic esters, fluorinated hydrocarbons, docosanol (C22), tricosanol (C23), tetracosanol (C24), pentacosanol (C25), hexacosnaol (C26), heptacosanol (C27), octacosanol (C28), nonacosanol (C29), triacontanol (C30) and extended analogs, and combinations thereof.

10. The thermal indicator as claimed in claim 8, wherein the at least one interactive additive is present in an amount between 0.1% to 99% by weight of thermopolymeric switching medium.

11. The thermal indicator as claimed in claim 8, wherein the at least one interactive additive is present in an amount between 5% to 95% by weight of thermopolymeric switching medium.

12. The thermal indicator as claimed in claim 8, wherein the at least one interactive additive is present in an amount between 10% to 90% by weight of thermopolymeric switching medium.

13. The thermal indicator as claimed in claim 8, wherein the at least one interactive additive is present in an amount between 20% to 80% by weight of thermopolymeric switching medium.

14. The thermal indicator as claimed in claim 1, further comprising at least one emulsifier selected from the group consisting of lipids, long chain alcohols, lecithins, glycol lipids, quatemized amines with lipid tails, and charged ionic detergents, and combinations thereof.

15. The thermal indicator as claimed in claim 14, wherein the at least one emulsifier is present in an amount between 0.001% to 10% by weight of thermopolymeric switching medium.

16. The thermal indicator as claimed in claim 14, wherein the at least one emulsifier is present in an amount between 0.01% to 5% by weight of thermopolymeric switching medium.

17. The thermal indicator as claimed in claim 14, wherein the at least one emulsifier is present in an amount between 0.1% to 1% by weight of thermopolymeric switching medium.

18. A thermal indicator for visually determining and monitoring temperature of cooking food, comprising:
   a) a barrel having an orifice communicating with a cavity within said barrel, said barrel being adapted for insertion into the article to be monitored;
   b) an indicator disposed in said cavity and adapted for sliding travel therein between a retracted position with said indicator partially protruding from said cavity within said barrel indicating the food is in an uncooked state and an extended position visually indicating that the food is in a cooked state and that the food is cooked to a desired temperature and doneness;
   c) means for resiliently biasing said indicator away from said retracted position and toward said extended position; and
   d) an organic thermopolymeric switching medium for releasably retaining said indicator in said retracted position,
   wherein said thermopolymeric switching medium, when at a temperature below the predetermined temperature, maintains said indicator in said retracted position, and when at a temperature equal to or higher than the predetermined temperature, yields to permit release of said indicator, said biasing means urging said indicator into said extended position for visual indication that the food is cooked to a desired temperature and doneness,
   whereby the thermopolymeric switching medium undergoes a thermal transition from a solid phase to a liquid phase at the predetermined temperature indicating the food is cooked to the desired temperature and doneness.

19. The Thermal indicator as claimed in claim 18, further comprising at least one inert additive selected from the group consisting of sugars, salts, starches, cellulose non-melting metal filings, powdered plastics, polymers, silicone, silicates, chromatography resins, ceramic resins, chalk, glass, sand, air, oils, water, and high boiling liquid polymeric materials, and combinations thereof.

20. The thermal indicator as claimed in claim 19, wherein the inert additive is present in an amount between 0.1% to 99% by weight of thermopolymeric switching medium.

21. The thermal indicator as claimed in claim 19, wherein the inert additive is present in an amount between 5% to 95% by weight of thermopolymeric switching medium.

22. The thermal indicator as claimed in claim 19, wherein the inert additive is present in an amount between 10% to 90% by weight of thermopolymeric switching medium.

23. The thermal indicator as claimed in claim 19, wherein the inert additive is present in an amount between 20% to 80% by weight of thermopolymeric switching medium.

24. The thermal indicator as claimed in claim 18, further comprising at least one interactive additive selected from the group consisting of bee's wax, root extracts, long chain hydrocarbon analogs from the jojoba plant, petroleum distillation analogs, and synthetic organic analogs, and combinations thereof.

25. The thermal indicator as claimed in claim 24, wherein the at least one interactive additive is selected from the group consisting of short and long chain alcohols, esters, acrylic esters, fluorinated hydrocarbons, docosanol (C22), tricosanol (C23), tetracosanol (C24), pentacosanol (C25), hexacosnaol (C26), heptacosanol (C27), octacosanol (C28), nonacosanol (C29), triacontanol (C30) and extended analogs, and combinations thereof.

26. The thermal indicator as claimed in claim 24, wherein the at least one interactive additive is present in an amount between 0.1% to 99% by weight of thermopolymeric switching medium.

27. The thermal indicator as claimed in claim 24, wherein the at least one interactive additive is present in an amount between 5% to 95% by weight of thermopolymeric switching medium.

28. The thermal indicator as claimed in claim 24, wherein the at least one interactive additive is present in an amount between 10% to 90% by weight of thermopolymeric switching medium.

29. The thermal indicator as claimed in claim 24, wherein the at least one interactive additive is present in an amount between 20% to 80% by weight of thermopolymeric switching medium.

30. The thermal indicator as claimed in claim 18, further comprising at least one emulsifier selected from the group consisting of lipids, long chain alcohols, lecithins, glycol lipids, quatemized amines with lipid tails, and charged ionic detergents, and combinations thereof.

31. The thermal indicator as claimed in claim 30, wherein the at least one emulsifier is present in an amount between 0.001% to 10% by weight of thermopolymeric switching medium.

32. The Thermal indicator as claimed in claim 30, wherein the at least one emulsifier is present in an amount between 0.01% to 5% by weight of thermopolymeric switching medium.

33. The thermal indicator as claimed in claim 30, wherein the at least one emulsifier is present in an amount between 0.1% to 1% by weight of thermopolymeric switching medium.

34. A thermal indicator for visually determining and monitoring the temperature of cooking food products, comprising:
 a) a barrel having an orifice communicating with a cavity within said barrel, said barrel being adapted for insertion into the article to be monitored;
 b) an indicator disposed in said cavity and adapted for sliding travel therein between a retracted position indicating the food is in an uncooked state and an extended position indicating the food is in a cooked state and visually indicating that the food is cooked to a desired temperature and doneness;
 c) means for resiliently biasing said indicator away from said retracted position and toward said extended position;
 d) organic thermopolymeric switching medium for releasably retaining said indicator in said refracted position;
 e) at least one inert additive present in an amount between 10% to 90% by weight of thermopolymeric switching medium and selected from the group consisting of sugars, salts, starches, cellulose non-melting metal filings, powdered plastics, polymers, silicone, silicates, chromatography resins, ceramic resins, chalk, glass, sand, air, oils, water, and high boiling liquid polymeric materials, and combinations thereof;
 f) at least one interactive additive present in an amount between 10% to 90% by weight of thermopolymeric switching medium and selected from the group consisting of bee's wax, root extracts, long chain hydrocarbon analogs from the jojoba plant, petroleum distillation analogs, and synthetic organic analogs, and combinations thereof; and
 g) at least one emulsifier present in an amount between 0.01% to 1% by weight of thermopolymeric switching medium and selected from the group consisting of lipids, long chain alcohols, lecithins, glycol lipids, quaternized amines with lipid tails, and charged ionic detergents, and combinations thereof,
 wherein said thermopolymeric switching medium, when at a temperature below the predetermined temperature, maintains said indicator in said retracted position, and when at a temperature equal to or higher than the predetermined temperature, yields to permit release of said indicator, said biasing means urging said indicator into said extended position for visual indication that the food is cooked to a desired temperature and doneness,
 whereby the thermopolymeric switching medium undergoes a thermal transition from a solid phase to a liquid phase at the predetermined temperature indicatin the food is cooked to the desired temperature and doneness.

35. The thermal indicator as claimed in claim 34, wherein the inert additive is present in an amount between 20% to 80% by weight of thermopolymeric switching medium and the at least one interactive additive is present in an amount between 20% to 80% by weight of thermopolymeric switching medium.

36. The thermal indicator as claimed in claim 35 wherein the at least one interactive additive is selected from the group consisting of short and long chain alcohols, esters, acrylic esters, fluorinated hydrocarbons, docosanol (C22), tricosanol (C23), tetracosanol (C24), pentacosanol (C25), hexacosnaol (C26), heptacosanol (C27), octacosanol (C28), nonacosanol (C29), triacontanol (C30) and extended analogs, and combinations thereof.

* * * * *